United States Patent Office 3,501,950
Patented Mar. 24, 1970

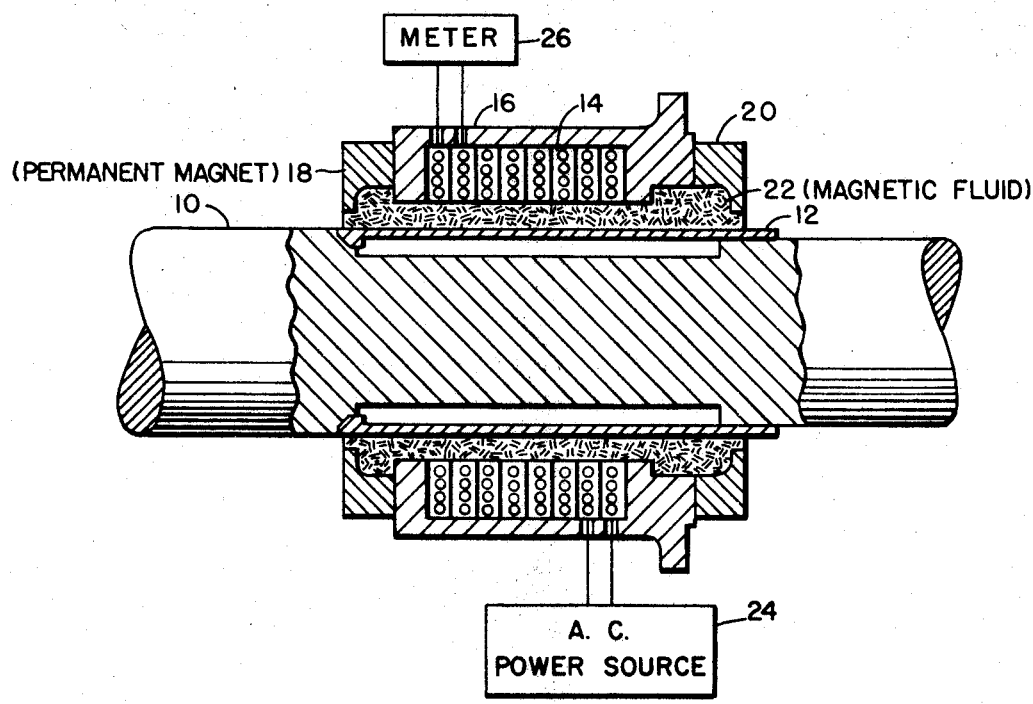

3,501,950
ELECTROMAGNETIC TORQUEMETER HAVING ITS AIR GAP ELIMINATED BY A MAGNETIC FLUID
Rudolph Hohenberg, Trumbull, Conn., assignor to Avco Corporation, Stratford, Conn., a corporation of Delaware
Filed Apr. 8, 1968, Ser. No. 719,335
Int. Cl. G01l 3/10
U.S. Cl. 73—136        8 Claims

ABSTRACT OF THE DISCLOSURE

An electromagnetic torquemeter comprising a transformer surrounding a shaft having a magnetic sleeve is provided with a magnetic fluid in the air gap between the sleeve and the transformer. The fluid is captured within the gap by means of permanent magnets.

BACKGROUND OF THE INVENTION

In the magnetic torquemeter disclosed in U.S. Patent No. 3,340,729, issued to Scoppe on Sept. 12, 1967, and assigned to the same assignee as this invention, the torque is measured by detecting the change in the transformer output resulting from the strain applied to a magnetic sleeve affixed to the shaft. Similar prior art devices not using the magnetic sleeve are shown in Dahle Patent No. 3,011,340 and also in the article of Beth et al. entitled "Magnetic Measurement of Torque in a Rotating Shaft" published in Review of Scientific Instruments, volume 25, No. 6, June 1954, pages 603–607.

The existing state of the art limits the use of electromagnetic torquemeters to applications where the radial gap between the transformer head assembly and the rotating shaft does not exceed approximately .015 inch. Furthermore, the radial clearance must not vary more than approximately ±.003 inch to achieve a maximum error in the order of ±2% with changes in shaft speed and temperature. The use of a magnetic fluid in the gap permits gaps which are larger than .015 inch and allows tolerances several magnitudes larger than .003 inch, while having an accuracy potential on the order of .5% maximum error.

A suitable magnetic fluid is now available for this purpose and is described in the copending application of Litte and Beltracchi, Ser. No. 669,952, filed Sept. 22, 1967, and assigned to the same assignee as this invention. Other references relating to the manufacture and composition of suitable magnetic fluids are found in a paper entitled "Ferrohydrodynamic Fluids for Direct Conversion of Heat Energy," by Rosensweig, Nestor and Timmins, appearing in the A.I.Ch.E.–I. Chem. joint meeting, June 1965, and a paper entitled "The Fascinating Magnetic Fluids," by Rosensweig, appearing in the New Scientist, 29, No. 479, Jan. 20, 1966.

The primary characteristic of the magnetic fluid is that it must be susceptible to capture by a magnetic field and, in addition, must have suitable electromagnetic properties for eliminating the effects of the air gap between the head assembly and the magnetic sleeve or shaft.

DESCRIPTION OF THE DRAWING

The single drawing is a schematic representation illustrating the basic concepts of this invention.

A rotating shaft 10 is provided with a magnetic sleeve 12, which, as described in the Scoppe patent, has the appropriate characteristics required for torquemeter applications. The primary and secondary windings of a transformer 14 are appropriately potted in a head assembly 16 and positioned about the shaft 10. Annular permanent magnets 18 and 20, suitably affixed to the ends of the head assembly 16, serve to capture a magnetic fluid 22 inserted between the head assembly 16 and the magnetic sleeve 12.

In operation, the primary windings of the transformer 14 are supplied with regulated alternating electric power from any convenient source 24, while the output developed across the secondary winding is applied to a meter circuit 26, which may be of the type shown in the Scoppe patent. The magnetic fluid 22, which is maintained in position, i.e., captured, by the permanent magnets 18 and 20, effectively eliminates the air gap normally found between the head assembly 16 and the magnetic sleeve 12. However, the gap between the head assembly and the sleeve may be relatively large and the tolerance requirements are not critical.

It is apparent that this invention will be susceptible to many modifications and adaptations. For example, the magnetic sleeve 12 need not be used provided the shaft 10 has the proper magnetic qualities. It is intended therefore that the invention be limited only by the scope of the appended claims as interpreted in the light of the prior art.

What is claimed is:

1. In an electromagnetic torquemeter for indicating the torque in a shaft by measuring the variations in the output of a transformer, the combination comprising:
    (a) said shaft, at least a portion of the length thereof having magnetic properties;
    (b) an annular transformer assembly positioned coaxially on said shaft along said portion and forming a gap between said assembly and said shaft, said portion providing a core for said transformer assembly; and
    (c) a magnetic fluid contained within and substantially filling said gap.

2. The invention as defined in claim 1 wherein a permanent magnet is positioned at each end of said transformer, said permanent magnets capturing said fluid and containing said fluid within said gap.

3. The invention as defined in claim 1 wherein said portion having magnetic properties comprises a sleeve affixed to said shaft.

4. The invention as defined in claim 3 wherein a permanent magnet is positioned at each end of said transformer, said permanent magnets capturing said fluid and containing said fluid within said gap.

5. In a shaft mounted transformer, the combination comprising:
    (a) said shaft, at least a portion of the length thereof having magnetic properties;
    (b) an annular transformer assembly positioned coaxially on said shaft along said portion and forming a gap between said assembly and said shaft, said portion providing a core for said transformer assembly; and
    (c) a magnetic fluid contained within and substantially filling said gap.

6. The invention as defined in claim 5 wherein a permanent magnet is positioned at each end of said transformer, said permanent magnets capturing said fluid and containing said fluid within said gap.

7. The invention as defined in claim 5 wherein said portion having magnetic properties comprises a sleeve affixed to said shaft.

8. The invention as defined in claim 7 wherein a permanent magnet is positioned at each end of said transformer, said permanent magnets capturing said fluid and containing said fluid within said gap.

References Cited

UNITED STATES PATENTS

| | | | |
|---|---|---|---|
| 3,340,729 | 9/1967 | Scoppe | 73—136 |
| 3,011,340 | 12/1961 | Dahle | 73—136 |
| 2,053,560 | 9/1936 | Janovsky | 73—133 |

OTHER REFERENCES

Rosensweig, R.: Fascinating Magnetic Fluids, in the New Scientist, Jan. 20, 1966, pp. 146–148.

RICHARD C. QUEISSER, Primary Examiner

J. WHALEN, Assistant Examiner

U.S. Cl. X.R.

336—20